United States Patent
Libby et al.

(10) Patent No.: US 6,592,454 B2
(45) Date of Patent: Jul. 15, 2003

(54) LOTTERY SYSTEM

(75) Inventors: Budd O. Libby, Atlanta, GA (US);
Daniel W. Bower, Atlanta, GA (US)

(73) Assignee: Telecom Productions, Inc., Atlanta, GA (US)

( * ) Notice: Subject to any disclaimer, the term of this patent is extended or adjusted under 35 U.S.C. 154(b) by 12 days.

(21) Appl. No.: 09/900,235

(22) Filed: Jul. 6, 2001

(65) Prior Publication Data

US 2003/0008695 A1 Jan. 9, 2003

(51) Int. Cl.[7] ............................................. A63F 13/12
(52) U.S. Cl. ............................. 463/6; 463/17; 463/18; 463/31
(58) Field of Search ............................. 463/6, 16–18, 463/31, 40, 42; 700/91

(56) References Cited

U.S. PATENT DOCUMENTS

| | | | |
|---|---|---|---|
| 4,257,107 A | 3/1981 | Heymsfield et al. | 702/161 |
| 4,288,077 A | 9/1981 | Rose et al. | 273/246 |
| 4,339,798 A | 7/1982 | Hedges et al. | 463/26 |
| 4,429,877 A | 2/1984 | Coppock | 273/139 |
| 4,494,197 A | 1/1985 | Troy et al. | 463/18 |
| 4,540,174 A | 9/1985 | Coppock | 463/17 |
| 4,689,742 A | 8/1987 | Troy et al. | 463/25 |
| 4,752,836 A | 6/1988 | Blanton et al. | 386/84 |
| 4,873,585 A | 10/1989 | Blanton et al. | 386/46 |
| 4,883,636 A | 11/1989 | Fantle, Jr. | 273/269 |
| 4,951,039 A | 8/1990 | Schwendeman et al. | 345/473 |
| 5,035,422 A | 7/1991 | Berman | 463/18 |
| 5,069,453 A | 12/1991 | Koza et al. | 463/17 |
| 5,212,636 A | 5/1993 | Nakazawa | 463/6 |
| 5,283,734 A | 2/1994 | Von Kohorn | 463/17 |
| 5,351,970 A | 10/1994 | Fioretti | 463/19 |
| 5,354,069 A | 10/1994 | Guttman et al. | 463/25 |
| 5,415,416 A | 5/1995 | Scagnelli et al. | 463/25 |
| 5,518,239 A | 5/1996 | Johnston | 273/139 |
| 5,569,082 A | 10/1996 | Kaye | 463/17 |
| 5,722,890 A | 3/1998 | Libby et al. | 463/17 |
| 5,938,200 A | 8/1999 | Markowicz et al. | 273/246 |
| 6,033,308 A | 3/2000 | Orford et al. | 463/28 |
| 6,193,605 B1 | 2/2001 | Libby et al. | 463/17 |
| 6,280,324 B1 | 8/2001 | Tenenbaum | 463/16 |
| 6,311,976 B1 | 11/2001 | Yoseloff et al. | 273/138.2 |
| 6,331,143 B1 | 12/2001 | Yoseloff | 463/18 |
| 6,478,676 B1 | 11/2002 | Dayan | 463/17 |
| 2002/0010012 A1 | 1/2002 | Dayan et al. | 463/13 |

FOREIGN PATENT DOCUMENTS

| | | | |
|---|---|---|---|
| AU | 712279 | 11/1999 | |
| AU | 199930163 A1 | 1/2000 | |
| AU | 200211974 | 8/2002 | |
| WO | WO 94/13374 | * 6/1994 | A65F/3/08 |
| WO | WO01/08761 | 2/2001 | |
| WO | WO02/45808 | 6/2002 | |

* cited by examiner

*Primary Examiner*—Andrew M. Dolinar
(74) *Attorney, Agent, or Firm*—Robert D. Katz; Cooper & Dunham LLP

(57) ABSTRACT

A computerized lottery or wagering system includes a game generator and a plurality of vendor stations that permit players to select game parameters. The game is graphically portrayed in animation as one or more races (horse race, dog race, car race, motorcycle race, etc.). The game may entail win, place, show, quinella, exacta/perfecta, trifecta, or series bets. At a predetermined time for each game, selection of game parameters for that game is ended and a winning sequence of numbers is randomly generated. The game generator selects and seamlessly composes a plurality of video segments into an animated video sequence of the race(s) corresponding to the winning sequence of numbers, for broadcast via RF transmission, microwave transmission, fiber optic cabling or closed circuit television lines. The video segments are rendered directly to a compressed digital format to maintain the video image in the highest quality possible. The system determines which players are eligible for a grand prize and, after the game is shown, announces the grand prize winner. The games are generated and broadcasted periodically, e.g., one-per-minute, once-per-day, once-per-week, etc.

20 Claims, 8 Drawing Sheets

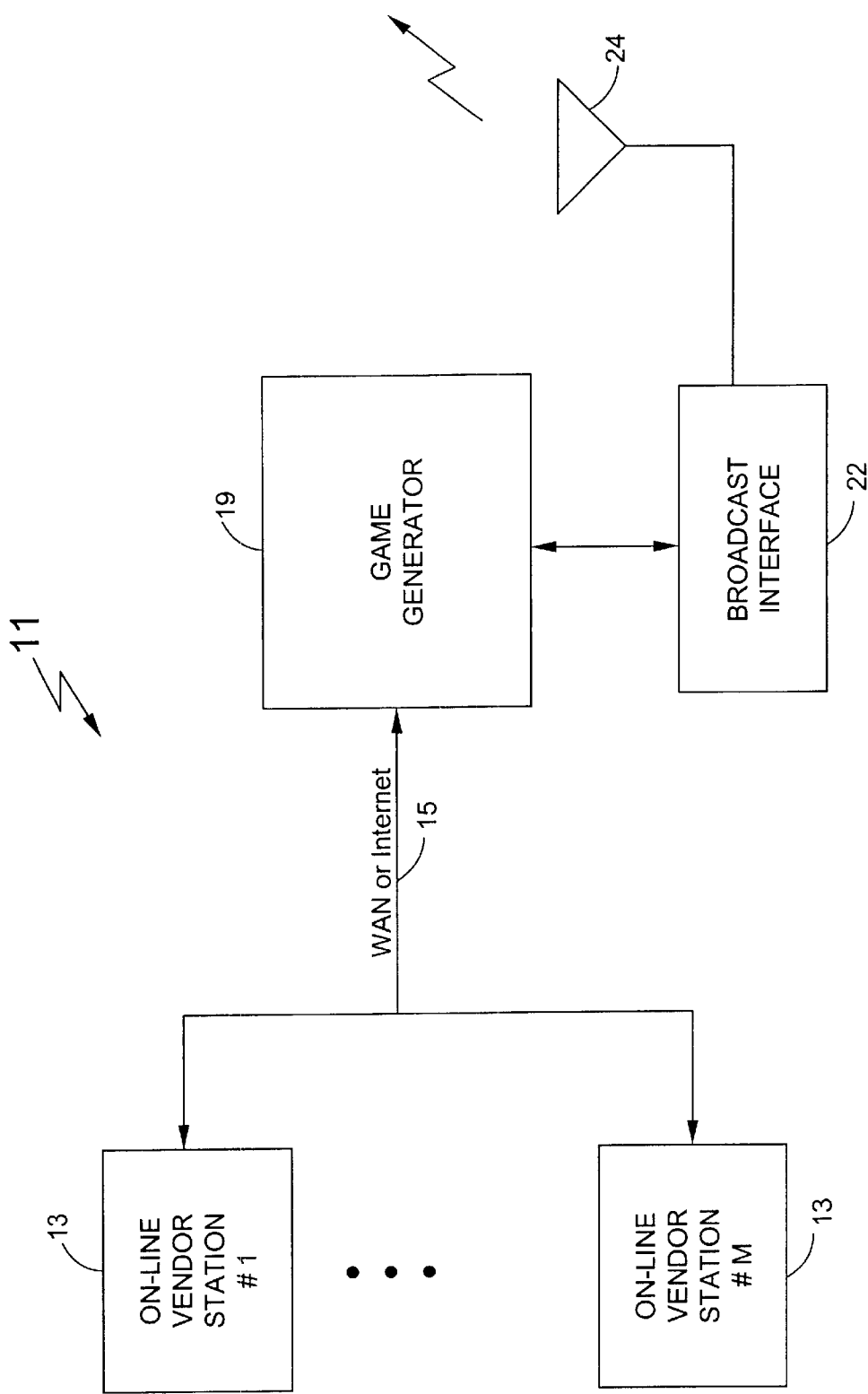

LOTTERY SYSTEM

FIELD OF THE INVENTION

The present invention relates to computerized wagering or lottery systems, and more particularly to a lottery or wagering system that graphically portrays the game in animation as a race.

BACKGROUND OF THE INVENTION

Many states have used lottery or on-line games, such as number games and "instant winner" games, as an added source of revenue. These games have become quite popular and successful.

One type of numbers game involves the use of numerous remote computer stations located in stores throughout the state which communicate with a central computer. A customer seeking to play the game marks the numbers he wishes to enter as his choices on a computer scannable or readable entry form. Alternatively, the customer may elect a Quick-pick option that is provided by many lottery systems for random selection of the customer's numbers by a computer. The customer pays the entry fee, usually no more than a few dollars, and the store clerk feeds the entry form into a card reader controlled by the computer, which registers the numbers selected and an ID number in the central computer. After wagering has been closed to new entries, a carefully monitored selection committee chooses the winning numbers. This may involve, for example, operating a machine loaded with balls having eligible numbers marked thereon to select at random the appropriate number of balls. This selection process often is broadcast on local television stations so that contestants can watch to see if their numbers have been selected. While many varieties of such games exist, examples of patents relating to this general scheme include U.S. Pat. No. 4,689,742 (Troy) and U.S. Pat. No. 4,494,197 (Troy).

U.S. Pat. No. 5,035,422 (Berman) appears to discuss an interactive game show which seeks to allow home viewers to select an outcome from a number of possible choices and to share in the prizes awarded on the show.

Similarly, U.S. Pat. No. 5,283,734 (Van Kohorn) discusses an interactive television wagering system whereby audience members can enter a response to a situation presented on television by entering a response on a keyboard. According to the patent, lottery games may be played by entering numbers at remote stations and stored in a central computer. The winning numbers are selected and presented at a remote station, following which winners can redeem their tickets.

Another computerized lottery wagering system is apparently discussed in U.S. Pat. No. 5,415,416 (Scangelli). This system appears to direct a telephone caller with an automatic call director through a number of selections to assist the caller in placing a bet; the cost of the bet is charged to a credit or debit card. The system assigns an associated ticket number to each customer.

Each of the above-identified patents is incorporated by reference herein in their entirety. While the foregoing patents attempt to make lotteries more accessible to bettors, they do not vary much from standard on-line games. It appears that states and other entities running such lottery games have experienced some difficulty in increasing the number of interested day-to-day participants, and in maintaining the day-to-day interest of those who do participate on a regular basis.

As a result, a need exists for a lottery game which enhances the intrinsic excitement of the game to maintain and preferably increase the interest of those who do not play often, as well as the interest of everyday players.

SUMMARY OF THE INVENTION

The present invention overcomes these and other disadvantages of prior games and provides a lottery system having in one embodiment one or more vendor stations and a game generator graphically portraying a lottery result in animation as a race for video display. The vendor stations are configured to provide predetermined game parameters corresponding to race participants to a player for selection. The game generator is configured for data communications with the vendor station or stations, and has a storage device storing a plurality of video segments of animated races, a lottery result selector randomly selecting at a predetermined time an order of finish of the race participants in the race to be graphically portrayed, a game controller retrieving selected ones of the video segments stored in the storage device according to the order of finish selected by the lottery result selector and composing the retrieved segments into a video sequence, and a communication interface communicating the composed video sequence to the at least one vendor station. The composed video sequence is preferably contiguous and seamless.

The race may comprise a plurality of stages, with each stage having a corresponding subset of the plurality of video segments. The game controller selects for each stage one video segment from the corresponding subset.

There may be a plurality of combinations of the video segments stored in the storage device that are possible for each order of finish. The game controller selects one of the plurality of combinations that are possible for the selected order of finish.

The present invention also provides a lottery system which graphically portrays a lottery result in animation as K races. The system has at least one vendor station and a game generator. The vendor station is configured to provide predetermined game parameters corresponding to race participants of the K races to a player for selection. The player selecting a sequence of K selected ones of the game parameters corresponding to the K races. The game generator is configured for data communications with the vendor station, and has a storage device storing a plurality of animated races, and a lottery result selector randomly selecting winners of the K races at a predetermined time after the selected game parameters have been communicated by the at least one vendor station to the game generator. The game generator retrieves K selected ones of the plurality of animated races stored in the storage device according to the K race winners selected by the lottery result selector, and composes the retrieved races into a video sequence. The composed video sequence is communicated from the game generator to the at least one vendor station. The received video sequence is displayed by the vendor station at a video display. The K selected animated races retrieved from the storage device preferably are distinct.

BRIEF DESCRIPTION OF THE DRAWINGS

The above and numerous other objectives, features and advantages that may be achieved by the present invention would be more readily understood from the following detailed description of the preferred embodiments by referring to the accompanying drawings wherein:

FIG. 8 is a block diagram of a lottery system according to another embodiment of the present invention.

DETAILED DESCRIPTION OF THE PREFERRED EMBODIMENTS

Figure 1:
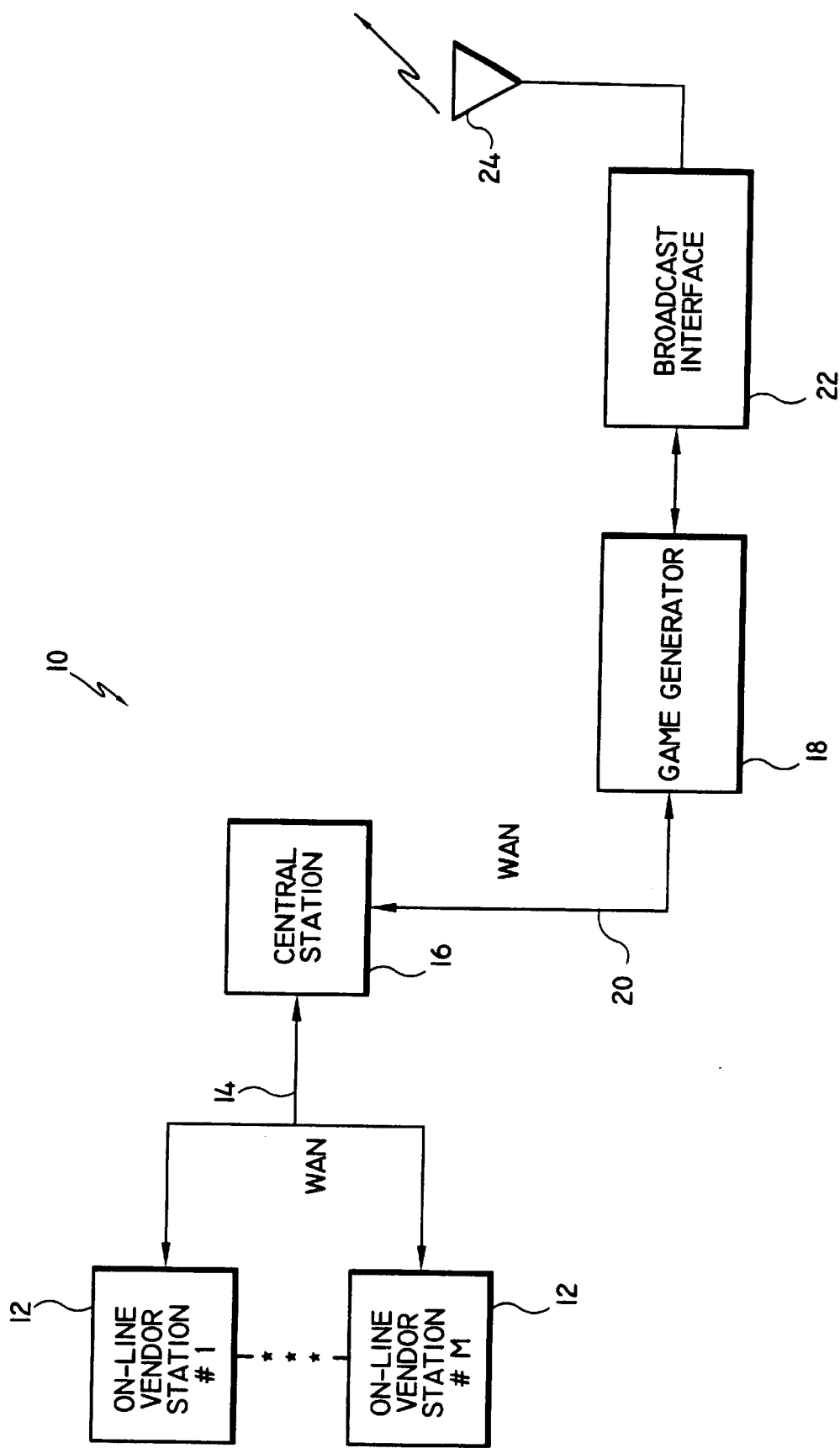
FIG. 1 is a block diagram of a lottery system according to one embodiment of the present invention.

In a computerized wagering or lottery game in accordance with a preferred embodiment of the present invention, players select a sequence-specific subset of K numbers that are selected from a predetermined set of integers. K is predetermined and the number of integers in the set may be larger than or equal to K. The selected numbers may be either non-repeating (i.e. mutually exclusive) or repeating (i.e. a number may appear more than once in the selected sequence). When the selected numbers must be non-repeating they may define, for example, horses in one horse race for a win, place, show, quinella, exacta/perfecta or trifecta bet. When the numbers may be repeating they may define, for example, selected horses in K respective horse races for a series bet.

The players are issued tickets identifying the respective sequence-specific subsets of K numbers which they selected. Each issued ticket is assigned a unique multidigit identifier which identifies the ticket with the player making the selection. The identifiers of all issued tickets are stored for selective retrieval. After all the tickets are issued, one sequence-specific subset of K numbers is randomly selected, and the identifiers of all issued tickets bearing the one sequence-specific subset are selectively retrieved from memory. One of the retrieved identifiers and the ticket to which the one identifier is assigned is randomly selected to determine a grand prize winner of the lottery. Alternatively, the grand prize winner may be selected from the pool of all players of the game.

The types of lottery games contemplated include games where the player can select predefined game parameters, such as characters, letters or numbers. The game may be graphically portrayed in animation as a race wherein the game parameters are numbers associated with the participants in the race. Each race has a number of race participants equal to the number of integers in the set and respectively designated by corresponding integers of the set. Examples of some games contemplated include (without limitation) horse races, dog races, car races and motorcycle races.

Preferably, an animated video sequence representing one race in the case of non-repeating numbers in the sequence-specific subset, or K races in the case of repeating numbers in the sequence-specific subset, is generated and, after all the tickets are issued, broadcasted. The games may take place periodically at virtually any interval, e.g., one-game-per-minute, one-game-per-five-minutes, one-game-per-day, one-game-per-week, etc. If the games are broadcasted on public or cable television, the frequency of the broadcasted games, of course, would depend in part on program scheduling of the television station.

For the purposes of explaining the present invention, the game discussed below is a horse racing game wherein players have three ways in which to win: 1) picking the win, place or show horse; 2) picking the win and place horses in exact order of finish (a perfecta or exacta) or in either order of finish (a quinella); and 3) picking the win, place and show horses (a trifecta). The players eligible for the grand prize may be only the trifecta winners. Alternatively, all winners or all players may be eligible for the grand prize.

In accordance with a preferred embodiment of the present invention, a computerized lottery or wagering system includes a game generator connected to a plurality of remote on-line vendor stations. In one embodiment, a central station serves as a communication interface for transferring the selected game parameters from the remote vendor stations to the game generator, and for transferring data regarding the winning results from the game generator to the remote vendor stations. In another embodiment, there is no direct connection between the vendor stations and the central station, and the game generator communicates directly with the remote vendor stations.

The plurality of remote vendor stations are configured to provide predetermined game parameters to a player for selection using, for example, a keyboard. Typically, the selected game parameters are entered by an operator of the remote vendor station. Alternatively, if a kiosk type of remote station is used, the player can directly select the game parameters. The remote stations transfer the selected game parameters to the game generator either directly or via the central station.

At a predefined time, selection of the game parameters is ended for a particular game. The game generator or an operator randomly selects the winning sequence of numbers associated with a game event, for example, the win, place and show horses. The game generator includes memory which stores a plurality of video sequences representing game events. Preferably, the video sequences are animated representations of the particular game event.

Thus, for example, if the game event is a horse race with twelve participating horses, the game generator memory can store an animated race for each win, place and show combination selected from the twelve horses. The game generator then retrieves from memory a predefined video sequence of a race associated with the selected winning numbers. This video sequence is broadcasted using standard television transmission techniques so that the players can watch the game and root for their selections. In addition, the system determines which players are eligible for a grand prize pool and after the broadcast of the game announces the grand prize winner.

Each game event is randomly selectable by the game generator. The selected event is retrieved from memory and formatted for broadcast via, for example, RF transmission, microwave transmission, fibre optic cabling or closed circuit television lines.

Turning to the figures, a block diagram of a lottery system according to one embodiment of the present invention is shown in FIG. 1. The lottery system 10 includes a plurality of remote on-line vendor stations 12 that are linked over a wide area network (WAN) 14 to a central station 16. A game generator 18 is connected to the central station 16 over a wide area network 20. In this configuration, the central station 16 acts as a communication interface between the game generator 18 and the remote on-line vendor stations 12. As a result, the game generator can connect to existing lottery systems having a plurality of remote on-line vendor stations connected to a central station.

In another embodiment of the present invention, as shown in FIG. 8, game generator 19 in lottery system 11 is connected directly to a plurality of remote vendor stations 13 via WAN 15 (or the Internet). The game may be transmitted via, for example, a closed circuit television line. In this configuration, the system does not need to be connected to an existing lottery system.

To broadcast the video sequence of the race, the game generator is connected to a broadcast interface 22 which formats the video data stored in the game generator memory for broadcast via antenna 24. In this configuration, the broadcast interface is configured for RF transmission of television signals. The video is transferred in accordance with known RF transmission methods. Alternatively, the broadcast interface can be configured to format the video data for microwave transmission to satellites and reception by the public on conventional satellite dishes. In another alternative configuration, the broadcast interface can be configured to transmit the video along fiber optic cabling or on closed circuit television lines. Finally, the broadcast and/or communication with the vendor stations may be through either a wired or wireless connection to the Internet.

Figure 2:
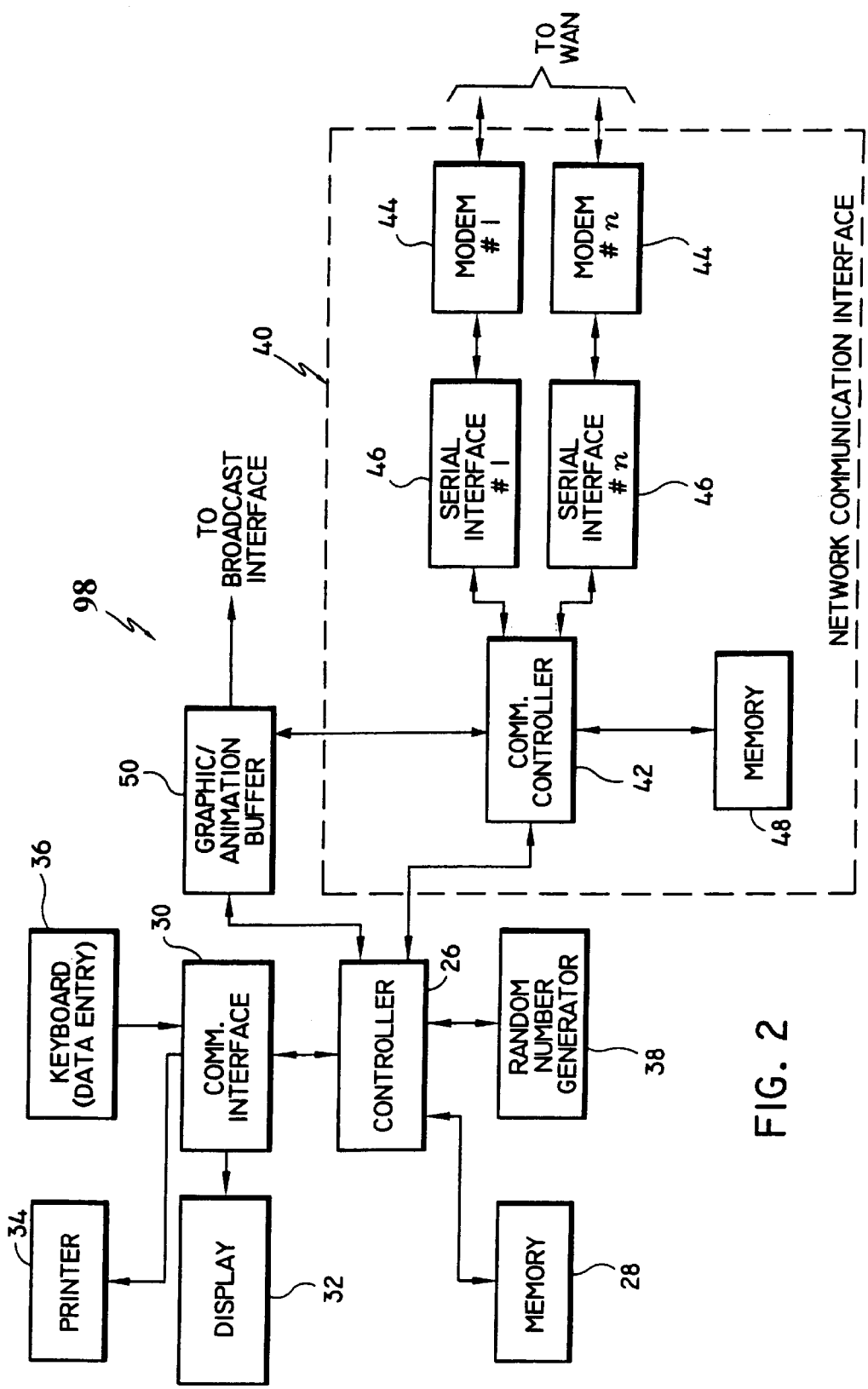
FIG. 2 is a block diagram of a game generator in an exemplary embodiment of the present invention.

Referring now to FIG. 2 which shows a block diagram of a game generator in accordance with an exemplary embodiment of the present invention, game generator 98 preferably includes a microprocessor based controller 26 having memory 28 for storing programs, such as system and application programs. Memory 28 is provided with sufficient storage capacity also to store numerous video sequences associated with the particular game or race. The memory may include RAM, ROM and mass storage memory devices.

To illustrate, the described lottery game may be portrayed as, for example, a horse race with twelve horses competing. Thus, for win, place and show results there are 1,320 possible winning combinations, i.e. 1,320 possible outcomes representing twelve horses taken three at a time. As a result, any one of 1,320 races can be broadcasted depending on the selected outcome. The races are preferably animated versions of a horse race.

To create high quality animated horse races, each of the twelve horses are modeled and animated and then combined with modeled and animated backgrounds to create the horse race. The animated race is then voiced over with a race call and crowd and horse background noise to provide a realistic horse race.

Modeling of the horses and jockeys is accomplished by capturing the motions of real horses and jockeys on a treadmill using known motion capturing techniques. A computer may then be used to process the captured data and combine the captured motions with animated horses and jockeys. Once each horse and jockey are animated, the twelve horses are combined with the animated background to complete the animated race. Animation may be accomplished in accordance with a number of computer generated animation techniques, such as the methods disclosed in U.S. Pat. Nos. 4,951,039, 4,873,585 and 4,752,836, the contents of which are incorporated herein by reference.

The races preferably are stored in memory as segments of races, rather than complete races. The video sequence, at the time of selection, is built from these segments to create preferably a contiguous, seamless video sequence and audio sequence of a race. In an exemplary embodiment a video sequence consists of four stages of segments. The available segments in the embodiment are in sets of 1 ("Lead In" stage), 660 ("Trunks" stage), 1320 ("Branches" stage) and 3960 ("Leaves" stage). The seams between adjoined segments in a video sequence may be implemented as a branching function. At each seam there is a common frame that allows a seamless transition to one of the appropriate segments in the following stage. Thus, in the exemplary embodiment, the Lead In segment passes seamlessly into a randomly selected one of six hundred sixty available Trunk segments; each Trunk segment into a randomly selected one of two appropriate Branch segments; and each Branch segment into a randomly selected one of three appropriate Leaf segments. Thus, the (three different) Leaf finishes for each predetermined win, place and show combination may be combined with different possible Branches and Trunks to enhance entertainment through randomization, where possible. For example, if the sequence 5, 7, 9 is randomly selected as the winning win, place, show sequence, there would be three completely different finishes, not to mention assorted different intermediary Branches and Leaves, for the particular win, place, show combination. In addition, instead of having to animate, render and store 3,960 minutes (i.e. 1,320 different three-minute races) of video files for a twelve horse race, the exemplary embodiment described above requires only approximately 1,000 minutes.

When numbers in the selected winning sequence (of length K) may repeat, e.g., defining winning horses in K respective horse races, the video sequence that is composed would comprise K races. Segmentation of each race preferably is also used in this configuration. The number of available segments in each stage may be different, since only the winner of each race is of interest. There should be even in this configuration a variety of available finishes (i.e. Leaf segments) that would lead to each race result. However, when a number appears more than once in the randomly selected winning sequence of numbers, the selection of at least the Leaf segments for the races corresponding to that repeating number should be controlled so that the segment is not repeated in the video sequence of the K races.

Returning to FIG. 2, controller 26 is connected to communication interface 30 to provide serial and/or parallel data communications between controller 26, on the one hand, and display 32, printer 34 and keyboard 36, on the other hand.

A random number generator 38 may be included in the game generator to randomly select the winning numbers representing the win, place and show horses, prior to the broadcast of the race. The random number generator may be a hardware based number generator or a program based number generator, and either stand alone or integrated in the game generator. Alternatively, a station operator can randomly select the winning numbers representing the win, place, and show horses and enter the numbers via keyboard 36.

The random number generator can select any number of picks from the set. For example, with 15 horses in the race, the random number generator can draw anywhere from 1 to 15 numbers from the set. Also, the random number generator can select either non-repeating numbers or a sequence that includes numbers that may repeat. In a game with numbers that may repeat, the K randomly selected numbers may correspond to, for example, winning horses in K respective races.

The game generator also includes a network communication interface 40 that is configured for bidirectional communications with the remote on-line vendor stations. In one embodiment, the network communication interface 40 includes a microprocessor based communication controller 42 having memory and stored programs (e.g., system and application programs). The controller 42 is connected to modems 44 via serial interfaces 46. Depending upon the communication requirements of the system, i.e., the communication traffic, there may be a number of modems and corresponding serial interfaces 46 to accommodate a large number of remote player stations. The serial interfaces 46 provide a serial data buffer to communication controller 42. Memory 48 is connected to communication controller 42 and is provided to temporarily store data to be transferred via the network, as well as valid data received from the network for subsequent transfer to game generator controller 26.

After the winning sequence of numbers is randomly selected, by the random number generator or by an operator, and entered, game generator controller 26 retrieves a predefined video sequence of the game (e.g., a horse race) from memory 28 and transfers the video sequence to a broadcast interface 22. As described above, the video sequence preferably comprises a plurality of stored segments. Thus, in the preferred embodiment, game generator controller 26 randomly selects for each stage of the video sequence one of the segments appropriate for that stage, and composes the selected segments for each stage into a seamless video sequence.

The video data is preferably in digital form and may be formatted by, for example, a graphic/animation buffer 50 for transfer to the broadcast interface and/or to network communication interface 40.

In a preferred embodiment, segments are rendered directly to a digital compressed format such as MPEG 2. This allows the stored video image to be a very high quality. At the time of broadcast, the segments are concatenated together and fed to the broadcast interface which typically transmits a NTSC compatible analog signal. MPEG 2 is the same format used by satellite transmitters such as Direct TV. When the broadcast is via satellite, the MPEG 2 files may be transmitted directly without having to be converted (i.e. decompressed). Also, the data may be transmitted in serial digital format, since television stations will be required to convert to digital broadcasts to comply with legal and regulatory requirements.

Figure 3:
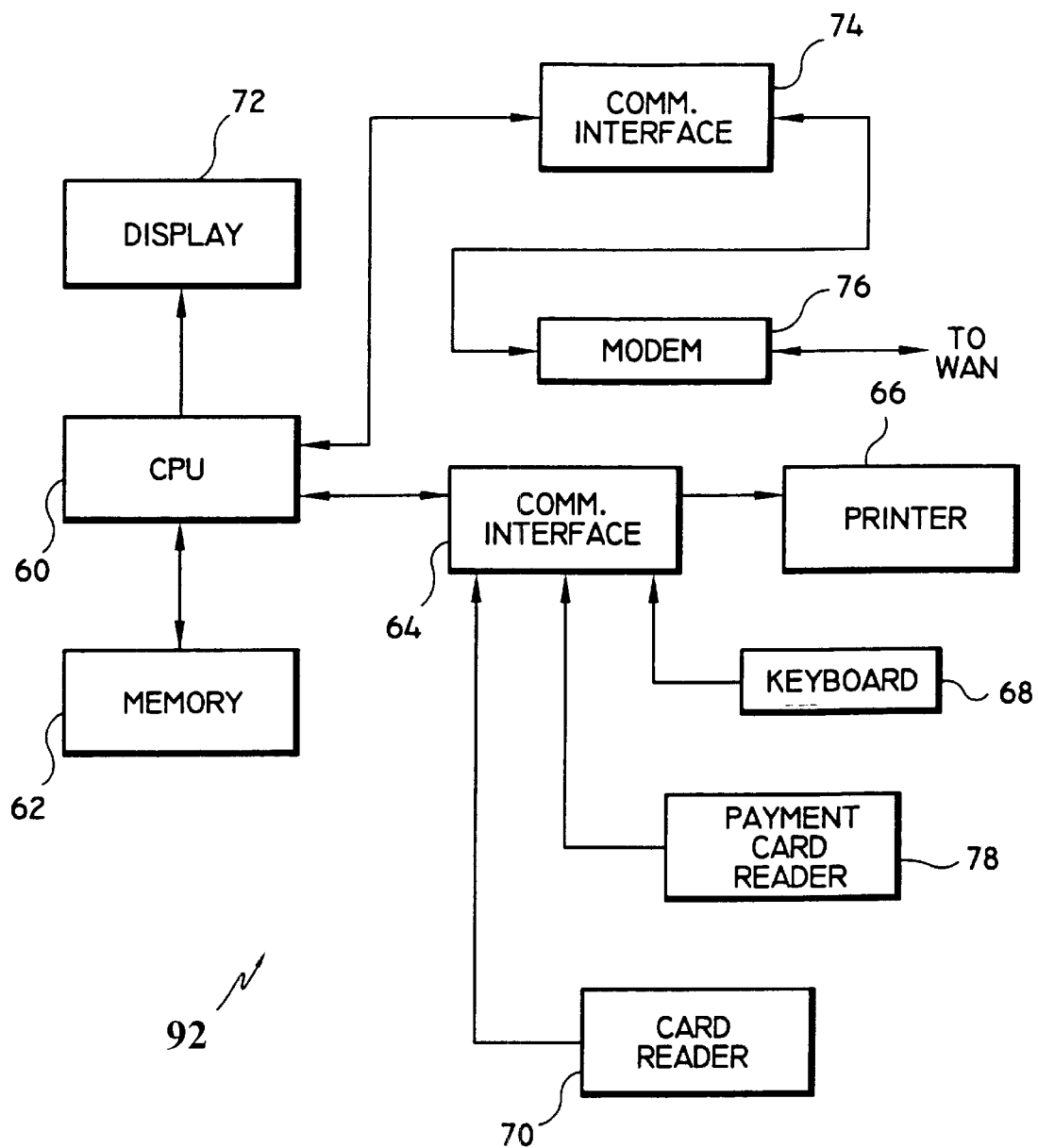
FIG. 3 is a block diagram of a remote player station in accordance with an exemplary embodiment of the present invention.

FIG. 3 shows a block diagram of a remote on-line vendor station in accordance with an exemplary embodiment of the present invention. Generally, each remote on-line vendor station 92 is configured for operation by an operator, e.g., store personnel, or for operation directly by the player. The operator or player enters the game parameters, for example, the numbers of the respective win, place and show horses, and pays for the game at the site of the remote station. The entered game parameters are hereinafter defined as the player selection data.

Preferably, each remote on-line vendor station includes a central processing unit 60 connected to memory 62 having stored therein system and application programs. The memory may include RAM, ROM and mass storage memory devices. A communication interface 64 is connected between the CPU 60 and printer 66, keyboard 68, and card reader 70 for communication with the remote on-line vendor station. The CPU 60 is connected to a display 72, such as a LCD display, a monitor and the like, to provide visual messages or prompts to the operator or player.

Communication interface 74 is connected to a wide area network via modem 76 and to remote station CPU 60 to facilitate data communication between the remote on-line vendor stations and the game generator, directly or via a central station.

In this configuration, the remote on-line vendor station is configured for installation in, for example, a retail store and operated by personnel within the store. The player (or customer) selects, for example, the numbers of the respective win, place and show horses (i.e., the trifecta) and the operator can either enter the numbers via keyboard 68 or card reader 70 or elect the Quick-pick option for random selection of the numbers by a computer. Player selection data is stored in memory 62 along with corresponding player identification data. The player identification data may be the player's social security number or other indicia which associate the player with the player selection data.

Figure 4:
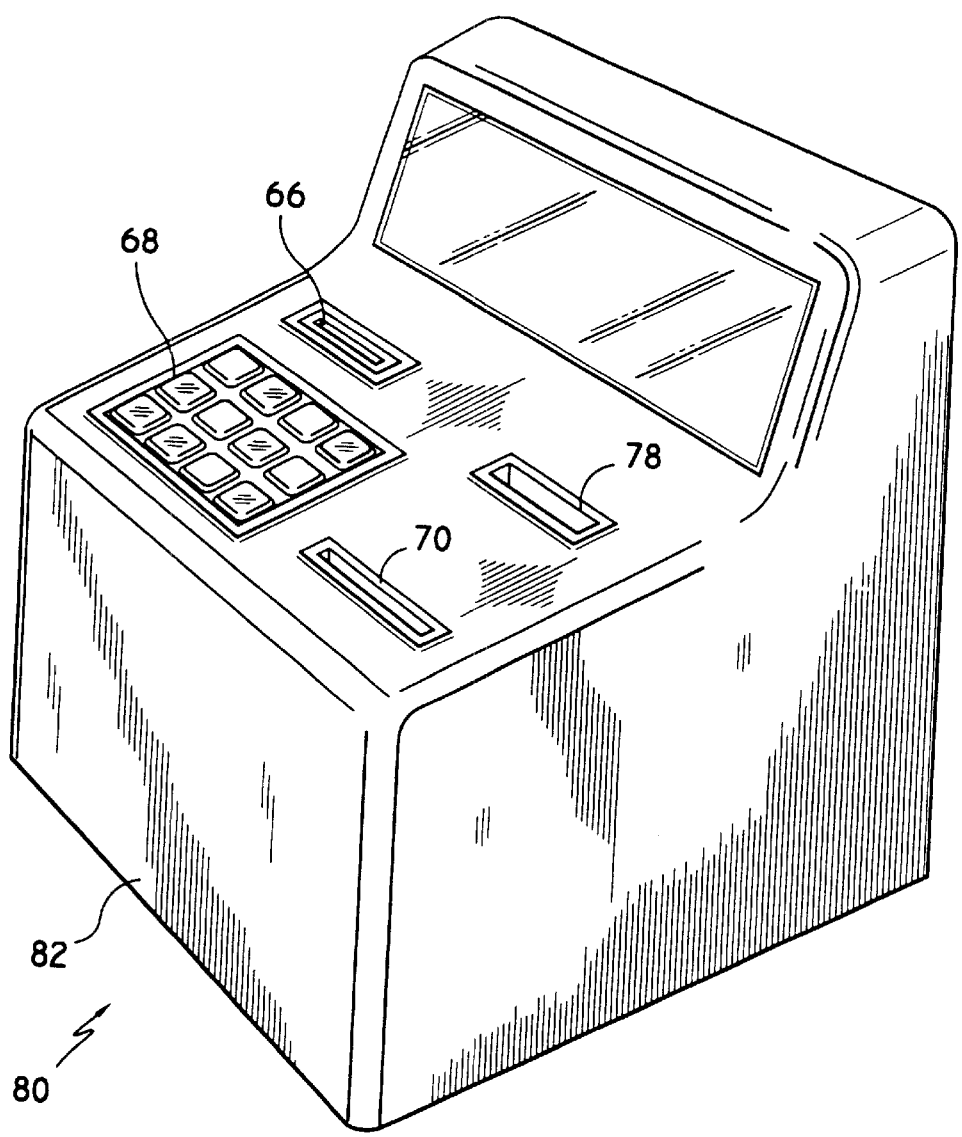
FIG. 4 is a perspective view of an alternative embodiment for the remote station, illustrating a kiosk for the remote station.

In an alternative configuration, the remote on-line vendor station may be a kiosk 80, as shown in FIG. 4. The internal components for the kiosk 80 are shown in FIG. 3. The kiosk 80 includes a stand alone housing 82 that may be located in public locations, such as shopping malls, and players can enter player selection data via keyboard 68 or card reader 70. In this embodiment, payment for the entry into the lottery may be made by cash or by a payment card medium, such as credit card, a debit card or the like, which is inserted into card reader 78. A ticket or receipt of the transaction is provided by printer 66.

Figure 5:
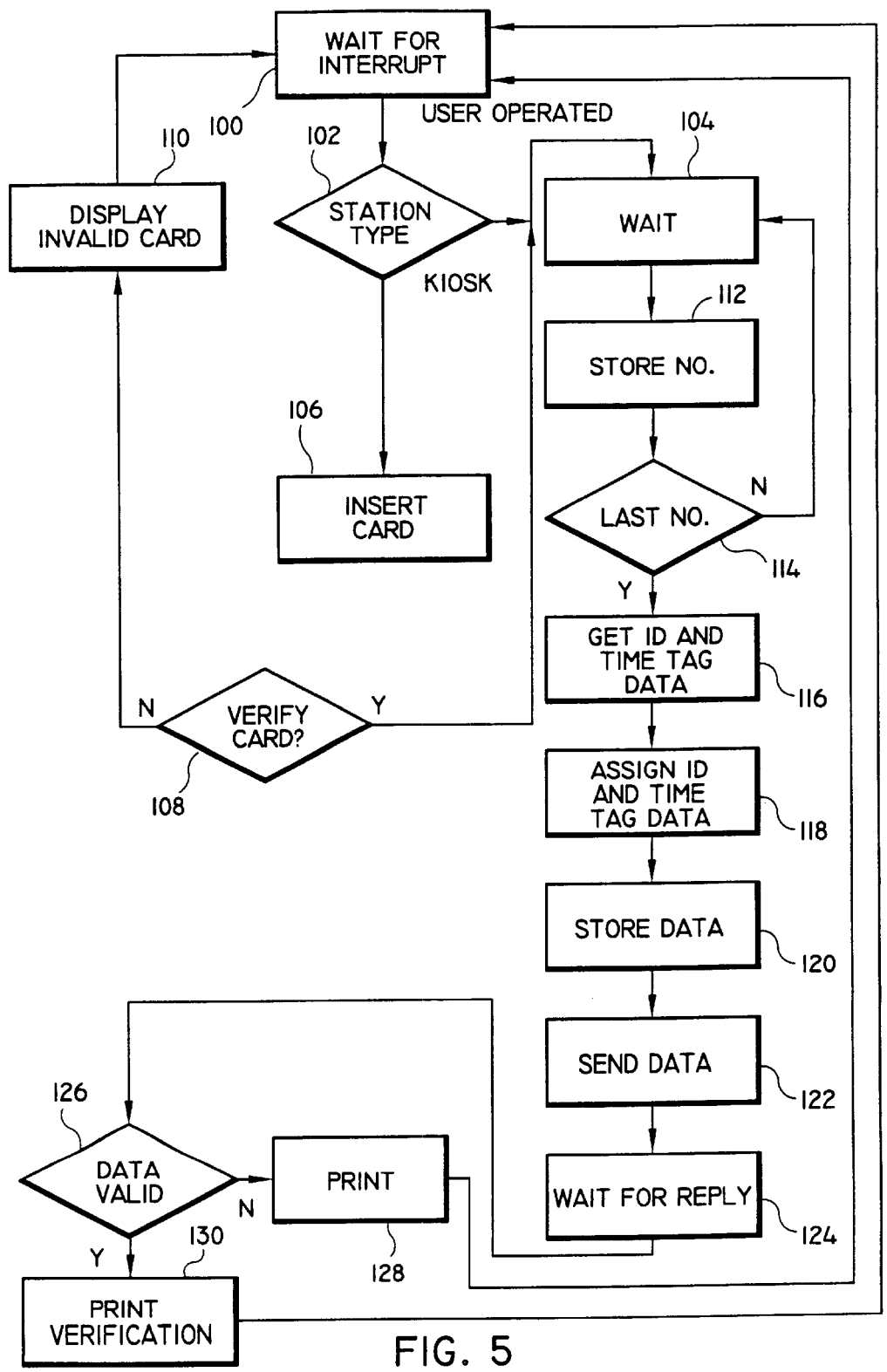
FIG. 5 is an exemplary flow diagram showing operation of the remote station of FIG. 3 or FIG. 4.

FIG. 5 is an exemplary flow diagram of the operation of the remote on-line vendor station. Initially, the remote station is maintained in an idle state in step 100 wherein the display 72 can be continuously updated to show, for example, statistical data and to provide instructions regarding how to enter player selection data. Once an interrupt is received by the CPU 60, the CPU initiates a data entry routine. If the remote station is operated by an operator, the station prompts the operator to enter the player selection data which as noted above can be entered by keyboard 68 or card reader 70 (steps 102 and 104). If the remote station is a kiosk, the player is prompted to insert a payment card into card reader 78 (steps 102 and 106). The CPU 60 then verifies that the card is valid by, for example, automatically contacting known credit agencies via modem 76 and receiving a code indicating whether the card is valid or not (step 108). If the card is invalid, then the player is notified on display 72 (step 110) that the transaction cannot be completed and the station returns to the idle state in step 100. If the card is valid, the player is instructed to enter the player selection data (step 104).

Using either type of remote on-line vendor station, when the player selection data is entered, the CPU 60 stores the data in memory 62, typically in RAM (step 112) In the horse race example, the numbers of the win, place and show horses are entered and stored until the last number is entered (step 114). Once the player selection data is completely entered, CPU 60 instructs the operator to enter identification data which will be associated with the player selection data for verification purposes in the event the player (a) chooses the correct win, place or show horse or (b) qualifies for and wins the grand prize (step 116). As noted, an example of player identification (ID) data is a social security number.

In addition to requesting player ID data, CPU 60 retrieves the time of day and date (i.e., time tag data) from a clock (not shown) within the remote station (step 118) to associate the player selection data with a particular time and day for determining if the player has a winning ticket. The ID data and the time tag data are stored in memory along with the corresponding player selection data (step 120).

Once the player selection data, the player ID data and the time tag data are stored, the data is sent to the game generator, directly or through a central station, via modem 76 (step 122). If the remote on-line vendor stations are connected directly to the game generator then data is sent to the game generator over the WA. After the data is transmitted to the game generator, the remote station waits for the game generator to reply that it received the player selection and associated ID and time tag data (step 124). If the reply is that the data received was invalid (step 126), the operator or player is notified via display 72 and/or printer 66 that a transmission error occurred and the station returns to the idle state (steps 128 and 100). If the reply is that the data transfer is complete (step 126) the player selection data and associated ID and time tag data are printed on printer 66 to provide the player with a receipt of the transaction which can be used by the player to claim any winnings (step 130). Once the receipt is printed, the station returns to the idle state of step 100.

Figure 6:
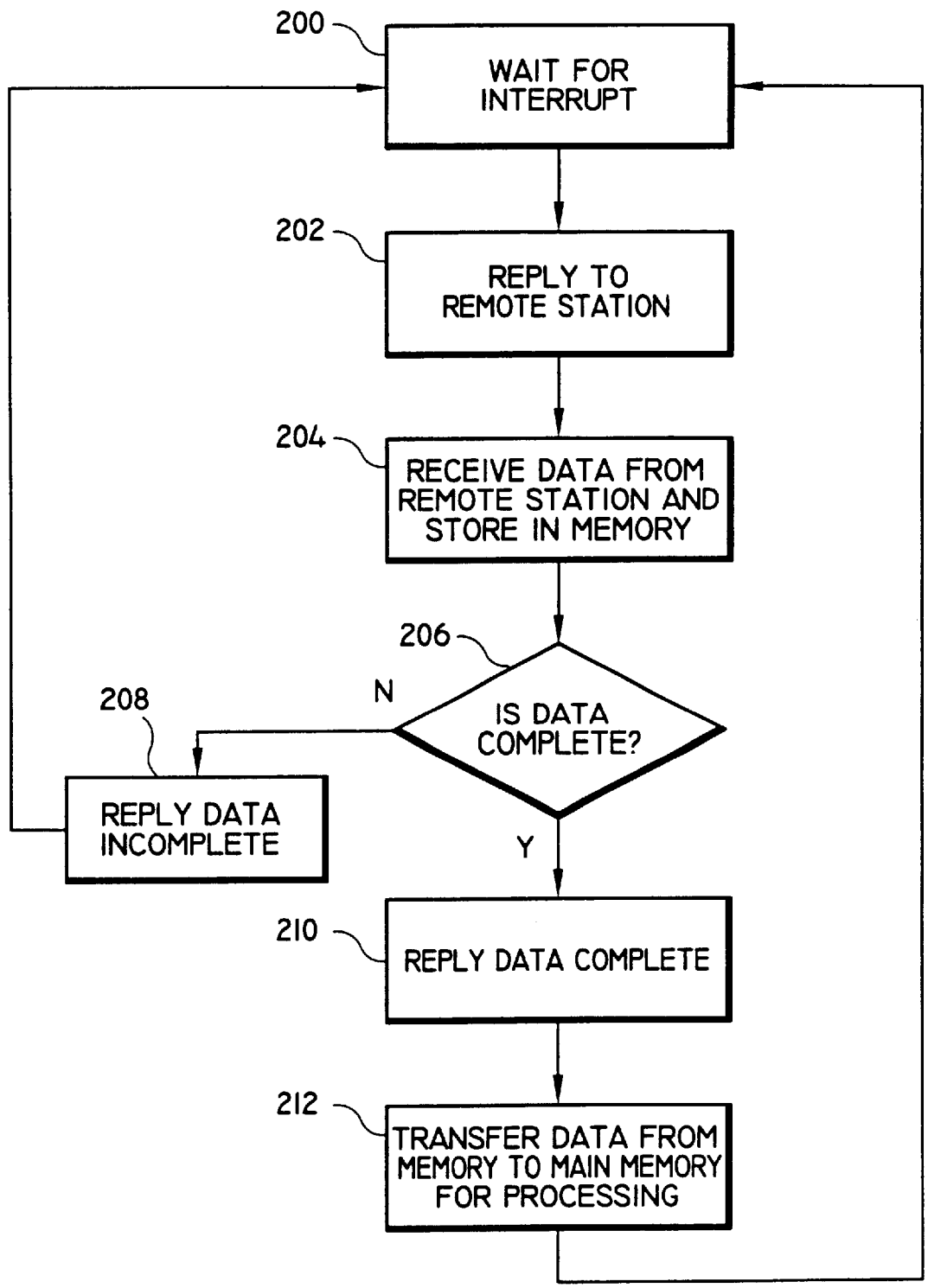
FIG. 6 is an exemplary flow diagram showing operation of the game generator of FIG. 2 receiving player selection data from a remote station.

FIG. 6 is an exemplary flow diagram of the transfer of data to the game generator. The game generator is initially in an idle state (step 200) and upon receiving an interrupt performs the desired routine. In FIG. 6, the interrupt may be a request from the remote station to send player selection data to the game generator. When the remote station requests to send data, the game generator provides a reply indicating that the game generator is or is not ready to receive the data (step 202). When the game generator is ready to receive data, the remote station sends the data to the game generator which stores the data in the network communication interface memory 48, seen in FIG. 2 (step 204). The network communication interface controller determines if the data transaction is complete (step 206). If the data transaction is incomplete, the game generator replies to the remote station that the transaction is incomplete and returns to the idle state (steps 208 and 200). If the data transaction is complete, the game generator replies that the transaction is complete and transfers the player selection, the ID and the time tag data to the main memory 24, seen in FIG. 2 (steps 210 and 212).

Figure 7:
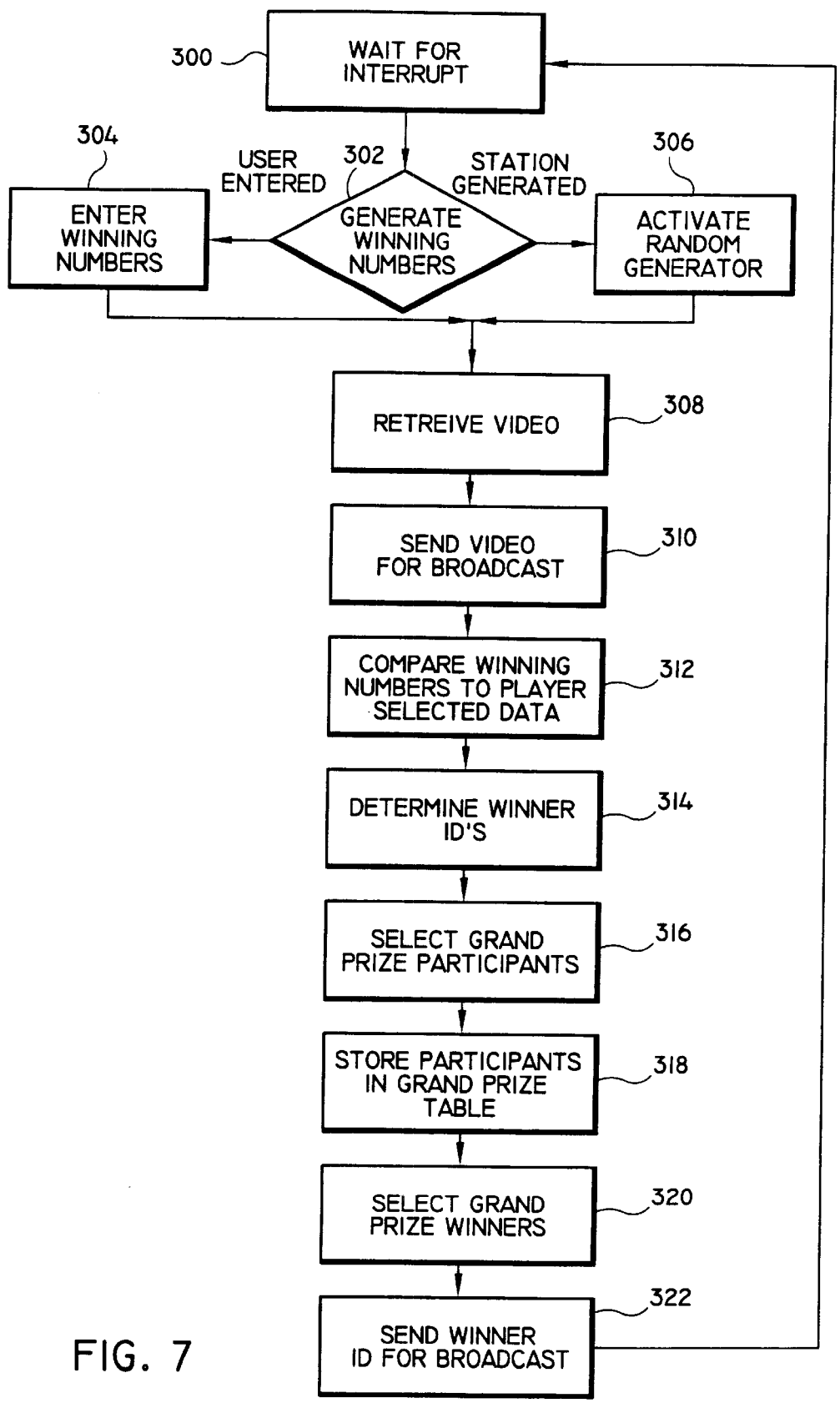
FIG. 7 is an exemplary flow diagram showing operation of the game generator of FIG. 2 generating lottery results.

FIG. 7 is an exemplary flow diagram of the operation of the game generator for generating the lottery results. Initially, the game generator is in an idle state (step 300) and upon receiving an interrupt, for example, an operator selected start command, the generator determines what the winning numbers are for a particular game. The winning numbers can be randomly chosen and entered into the generator by an operator via keyboard 36 (steps 302 and 304), or by random number generator 38 (steps 302 and 306).

Once the winning numbers are generated, the controller 26 composes a video sequence having an outcome that corresponds to the randomly generated winning numbers (step 308). As discussed above, the video sequence is preferably a seamless composition of stored segments randomly selected for corresponding stages of the video sequence.

The composed video sequence of the race is then transferred in step 310 via the network communication interface or the broadcast interface for broadcast, as described above. Before broadcasting the video sequence of the race, the game generator compares the selected winning sequence of numbers to all the entries of player selection data (step 312) and determines the number of winners (step 314).

The game generator controller 26 then determines which players qualify for the grand prize (step 316). As noted above in the horse racing example, one criterion for determining the grand prize participants is to select all the players who selected the trifecta. Alternatively, all players of the game may qualify for the grand prize. The identities of the grand prize participants may be stored in, for example, a grand prize data table (step 318) and the winner of the grand prize may be randomly selected by the random number generator 38 (step 320). Once the winner of the grand prize is selected, the name of the winner is broadcasted after the race (step 322).

It will be understood that various modifications can be made to the embodiments of the present invention herein without departing from the spirit and scope thereof. For example, various types of network resources and protocols may be used for the wide area network and various central and remote station configurations may be employed. Likewise, various animation techniques may be used to recreate the races by which the lottery winner is announced. Therefore, the above description should not be construed as limiting the invention, but merely as disclosing preferred embodiments thereof. Those skilled in the art will envision other modifications within the scope and spirit of the invention as defined by the claims appended hereto.

What is claimed is:

1. A lottery system graphically portraying a lottery result in animation as a race for video display, comprising:
   at least one vendor station configured to provide predetermined game parameters to a player for selection, the game parameters corresponding to race participants; and
   a game generator configured for data communications with the at least one vendor station, the game generator having
      a storage device storing a plurality of video segments of animated races;
      a lottery result selector randomly selecting at a predetermined time an order of finish of the race participants in the race to be graphically portrayed;
      a game controller retrieving selected ones of the video segments stored in the storage device according to the order of finish selected by the lottery result selector, and composing the retrieved segments into a video sequence; and
      a communication interface communicating the composed video sequence to the at least one vendor station.

2. The lottery system of claim 1 wherein the video sequence is contiguous and seamless.

3. The lottery system of claim 1 wherein
   the race comprises a plurality of stages,
   each stage has a corresponding subset of the plurality of video segments, and
   the game controller selects for each stage one video segment from the corresponding subset.

4. The lottery system of claim 1 wherein
   a plurality of combinations of the video segments stored in the storage device are possible for each order of finish, and
   the game controller selects one of the plurality of combinations that are possible for the selected order of finish.

5. The lottery system of claim 1 wherein the plurality of video segments stored in the storage device are in a digital compressed format.

6. The lottery system of claim 5 wherein
   the game controller concatenates the selected video segments, and the communication interface communicates the concatenated video segments in a serial digital format.

7. The lottery system of claim 1 wherein graphically portrayed lottery games are generated and broadcasted periodically.

8. The lottery system of claim 1 wherein the selected segments retrieved from the storage device are distinct.

9. A method of conducting a lottery game graphically portrayed in animation as a race for video display, comprising the steps of:

(a) storing a plurality of video segments of animated races in a storage device;

(b) providing predetermined game parameters to a player for selection, the game parameters corresponding to race participants;

(c) randomly selecting at a predetermined time after step (b) an order of finish of a plurality of participants in the race;

(d) retrieving selected ones of the video segments from the storage device according to the randomly selected order of finish;

(e) composing the selected segments into a video sequence; and (f) displaying the composed video sequence on a video display.

10. The method of claim 9, further comprising the step of selecting one player from a pool of all players of the lottery game as a grand prize winner.

11. The method of claim 9 further comprising the steps of:

digital compressing the video segments; and concatenating the selected digitally compressed segments for broadcast.

12. The method of claim 9 wherein graphically portrayed lottery games are generated and broadcasted periodically.

13. A game generator for a lottery system graphically portraying a lottery result in animation as a race for video display, comprising:

a storage device adapted to store a plurality of video segments of animated races;

a lottery result selector adapted to randomly select at a predetermined time an order of finish of the race participants in the race to be graphically portrayed; and a game controller, wherein the game controller retrieves selected ones of the video segments stored in the storage device according to the order of finish selected by the lottery result selector, and composes the retrieved segments into a video sequence.

14. The game generator of claim 13 wherein the video sequence is contiguous and seamless.

15. The game generator of claim 13 wherein the race comprises a plurality of stages, each stage has a corresponding subset of the plurality of video segments, and the game controller selects for each stage one video segment from the corresponding subset.

16. The game generator of claim 13 wherein each order of finish is associated with a plurality of combinations of the video segments stored in the storage device, and the game controller selects one of the plurality of combinations that are possible for the selected order of finish.

17. The game generator of claim 13 wherein the selected segments retrieved from the storage device are distinct.

18. The game generator of claim 13 wherein the plurality of video segments stored in the storage device are in a digital compressed format.

19. The game generator of claim 18 wherein the game controller concatenates the selected video segments.

20. The game generator of claim 13, wherein the lottery result selector randomly selects winners of K races at the predetermined time, and the game controller retrieves a selected subset of the video segments stored in the storage device, according to the K race winners selected by the lottery result selector, and composes the retrieved video segments into a video sequence of K races.

* * * * *